(12) United States Patent
Richter et al.

(10) Patent No.: US 11,226,237 B2
(45) Date of Patent: Jan. 18, 2022

(54) TEMPERATURE SENSOR MODULE WITH INTEGRATED LID STRUCTURE FOR SPURIOUS IR-CANCELLATION

(71) Applicant: Integrated Device Technology, Inc., San Jose, CA (US)

(72) Inventors: Raik Richter, Kreischa (DE); Marko Mailand, Dresden (DE)

(73) Assignee: Integrated Device Technology, Inc., San Jose, CA (US)

( * ) Notice: Subject to any disclaimer, the term of this patent is extended or adjusted under 35 U.S.C. 154(b) by 233 days.

(21) Appl. No.: 16/156,797

(22) Filed: Oct. 10, 2018

(65) Prior Publication Data

US 2019/0137343 A1 May 9, 2019

(30) Foreign Application Priority Data

Nov. 9, 2017 (EP) ..................................... 17200802

(51) Int. Cl.
*G01J 5/30* (2006.01)
*G01J 5/06* (2006.01)
(Continued)

(52) U.S. Cl.
CPC . *G01J 5/30* (2013.01); *G01J 5/06* (2013.01); *G01J 5/089* (2013.01); *G01J 5/0831* (2013.01);
(Continued)

(58) Field of Classification Search
CPC .... G01J 5/30; G01J 5/06; G01J 5/0831; G01J 5/0862; G01J 5/089; G01J 5/061; G01J 2005/065; G01J 2005/068; G01K 7/01
See application file for complete search history.

(56) References Cited

U.S. PATENT DOCUMENTS

| | | | |
|---|---|---|---|
| 9,917,242 B2* | 3/2018 | Barnett | G01J 5/04 |
| 10,113,915 B1* | 10/2018 | Bhat | G01J 5/0806 |

(Continued)

FOREIGN PATENT DOCUMENTS

| | | |
|---|---|---|
| DE | 19615244 A1 | 10/1997 |
| JP | H04335120 A | 11/1992 |

OTHER PUBLICATIONS

Extended European Search Report dated May 23, 2018 issued in European patent application No. 17200802.1 (7 pages).
(Continued)

*Primary Examiner* — Nathaniel T Woodward
*Assistant Examiner* — Philip L Cotey
(74) *Attorney, Agent, or Firm* — Haynes and Boone, LLP

(57) ABSTRACT

A temperature sensor module with an integrated lid structure for spurious IR-cancellation is disclosed. An improved temperature sensor module that allows detection of a maximum of the relevant IR-radiation from an object's surface of interest as well as generation of additional information about parasitic or spurious IR-radiation that distort the relevant thermal signal in order to enable a cancellation of interfering thermal signal portions is presented. The temperature sensor module includes a temperature sensing element, a sensor-interface control integrated circuit, whereas the temperature sensing element is coupled to the sensor-interface control IC, and a lid structure and a sensor packaging both defining a field of view of the temperature sensor module, wherein the lid structure is formed by a substrate comprising a second integrated temperature sensor connected to the sensor-interface control IC or an external connected processing unit.

10 Claims, 3 Drawing Sheets

(51) Int. Cl.
*G01K 7/01* (2006.01)
*G01J 5/08* (2006.01)

(52) U.S. Cl.
CPC .............. *G01J 5/0862* (2013.01); *G01K 7/01* (2013.01); *G01J 5/061* (2013.01); *G01J 2005/065* (2013.01); *G01J 2005/068* (2013.01)

(56) References Cited

U.S. PATENT DOCUMENTS

| | | | | |
|---|---|---|---|---|
| 10,436,647 | B2* | 10/2019 | Bhat ..................... | G01J 5/0831 |
| 2001/0035559 | A1* | 11/2001 | Ando ..................... | G01J 5/0815 |
| | | | | 257/443 |
| 2003/0122081 | A1* | 7/2003 | Herrera .............. | G01N 21/0332 |
| | | | | 250/341.6 |
| 2010/0084556 | A1* | 4/2010 | Oh .................... | H01L 27/14652 |
| | | | | 250/338.4 |
| 2013/0207214 | A1* | 8/2013 | Haddad ............... | H01L 31/0236 |
| | | | | 257/432 |
| 2014/0183361 | A1* | 7/2014 | Smith ..................... | G01J 5/045 |
| | | | | 250/338.3 |
| 2014/0239179 | A1* | 8/2014 | Novotny ............... | G01J 5/0225 |
| | | | | 250/338.4 |
| 2015/0253194 | A1* | 9/2015 | Van Buggenhout .. | G01J 1/0437 |
| | | | | 250/353 |
| 2015/0380627 | A1* | 12/2015 | Emadi .................. | G01J 5/0285 |
| | | | | 257/467 |
| 2016/0282194 | A1* | 9/2016 | Barnett ..................... | G01J 5/04 |
| 2017/0016762 | A1* | 1/2017 | Van Buggenhout ...... | G01J 5/06 |
| 2017/0138794 | A1* | 5/2017 | Fujino ........................ | G01J 5/10 |
| 2019/0101454 | A1* | 4/2019 | Bhat ........................ | G01J 5/045 |

OTHER PUBLICATIONS

Unm Digital Repository et al: "University of New Mexico Design of a Readout Integrated Circuit (ROIC) for Infrared Imaging Applications", Jan. 1, 2011 (Jan. 1, 2011), XP055473735, Retrieved from the internet: URL:http://digitalrepository.unm.edu/cgi/viewcontent.cgi?article=1134&context=ece_etds.

* cited by examiner

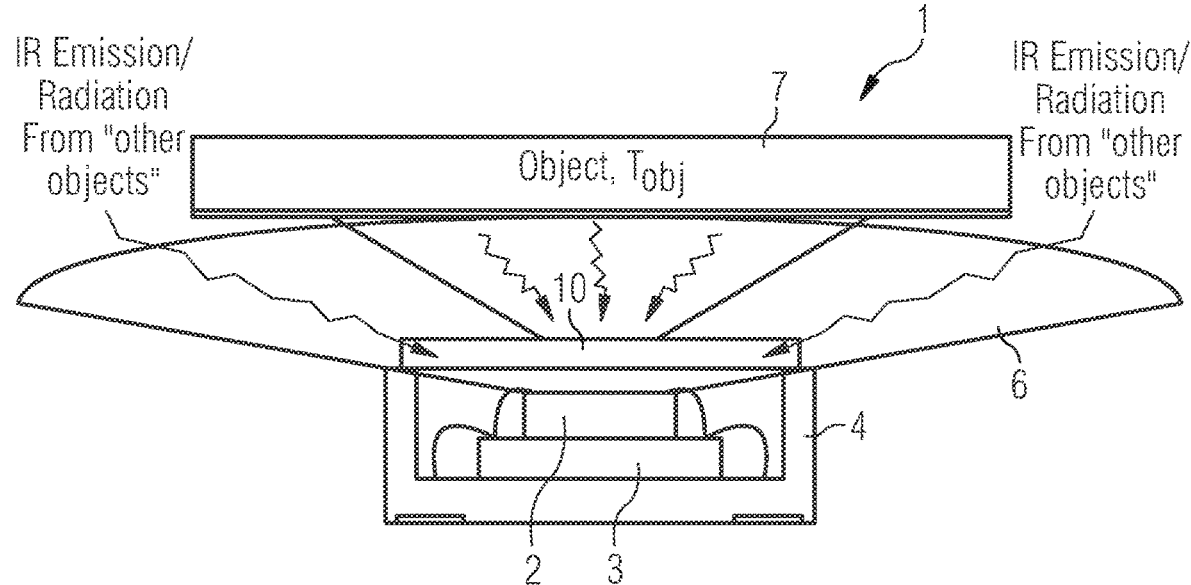
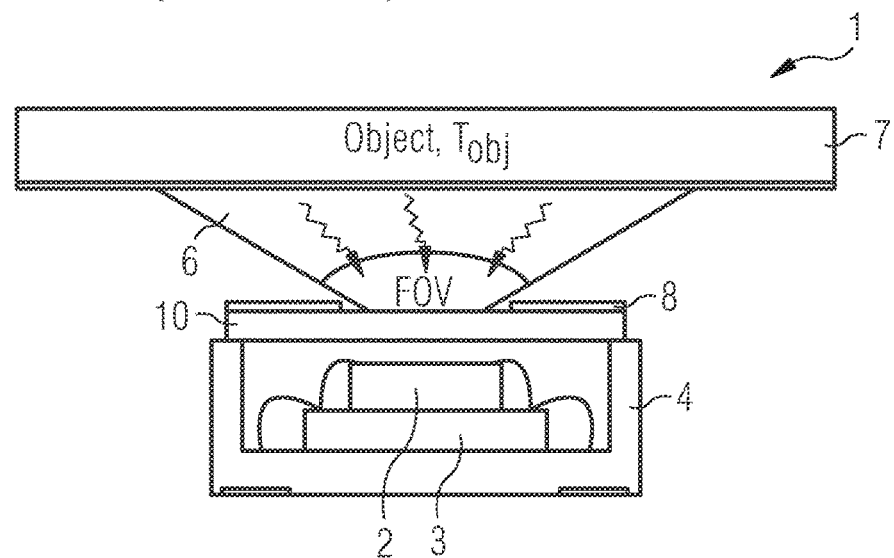

$\Phi_{IR}$...IR radiation (pass signal from object)
$\Phi_{LID}$...IR radiation (emission from lid's intrinsic temperature)
$\delta_i$...IR reflection at layer i
$\alpha_i$...IR absorption in layer i
$\tau_i$...IR transmission at layer i
$q_x$...thermal convection

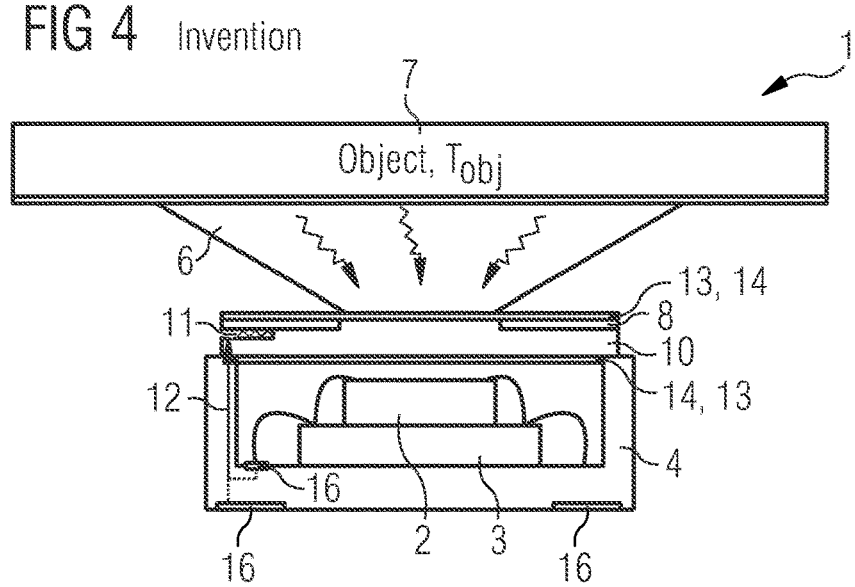
FIG 4  Invention
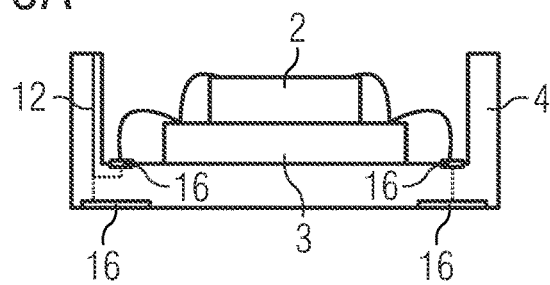
FIG 5A
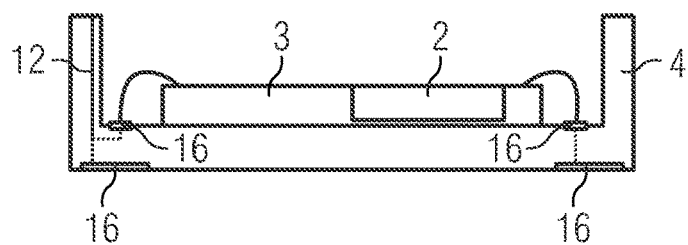
FIG 5B
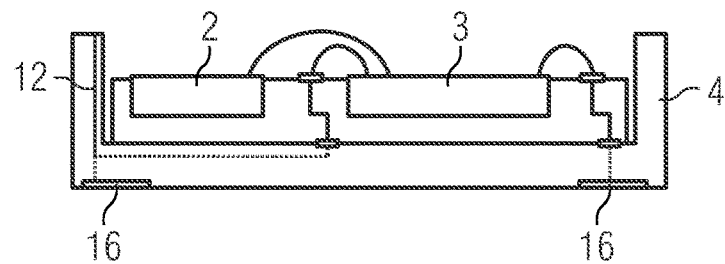
FIG 5C

TEMPERATURE SENSOR MODULE WITH INTEGRATED LID STRUCTURE FOR SPURIOUS IR-CANCELLATION

RELATED APPLICATIONS

This application claims priority to European Patent Application No. 17200802.1 filed Nov. 9, 2017, which is incorporated herein by reference in its entirety as part of the present disclosure.

TECHNICAL FIELD

The invention discloses a temperature sensor module with an integrated lid structure for spurious IR-cancellation.

DISCUSSION OF RELATED ART

For contact-less temperature measurements, typically the IR-(infrared) emission of an object's surface is detected and evaluated in order to deduce the object's effective temperature. The respectively detecting element or temperature sensing element can be a so-called thermocouple or thermopile sensor element which generally converts the infrared (IR)-radiation emitted by the object-under-test's surface or object of interest, collected by the sensing element, into an electrical voltage. The IR sensor element detects all IR-radiation that falls into the so-called field-of-view (FOV). In a cross-sectional view, the FOV has a pyramidal shape with a base angle on the sensor element's side. It is certain that the smaller the FOV's base angle, the more exact the object's surface temperature can be determined and the more far away (from the sensing element) the object of interest can be placed, respectively. Because with a smaller FOV only the interesting IR-radiation will be detected by the sensing element. The thermopile sensing element can be considered as an electrical voltage source providing an output voltage dependent on the IR-radiation (i.e. IR-temperature) and the sensor element ambient temperature. Any body with a temperature above the absolute zero point emits heat radiation, hence radiation in the infrared (IR) range.

The output voltage and the ambient temperature are measured or converted by further circuitry, e.g. implemented in a directly connected IC, with minimal physical distance to the thermopile sensing element. In the best case the further measuring IC is directly connected to the thermopile sensing element. FIG. 1 shows the principle construction of an underlying IR-sensor. The thermopile sensing element measures the object temperature, $T_{obj}$. The thermopile sensing element is somehow coupled to a sensor-interface integrated circuit (IC). This integrated circuit processes the thermopile output voltage and comprises an integrated on-chip temperature sensor for measuring the ambient temperature $T_{amb}$, i.e. the temperature on the backside of the sensor element, for example at the bottom side of the thermopile sensor module in FIG. 1. The thermopile sensing element and the sensor interface IC are formed in a housing which is formed as a package with a respective lid for entering the thermal radiation of the measurement object. Furthermore, FIG. 1 shows the object whose temperature shall be determined and schematically a "wide-angle" field-of-view of the sensing element. It can be seen, that the sensing element also collects and detects IR radiation from other, ambient objects. The sensor module lid structure that can be formed by e.g. an IR-filter and an aperture, serves the purpose to limit the field of view of the temperature sensing element, to filter out all un-wanted light and IR-radiation and to transmit the wanted IR-radiation to the sensing element inside the sensor housing.

FIG. 2 shows an intermediate step from a conventional, state-of-the-art thermopile sensor with lid structure, with or without filter-coating as described in FIG. 1, whereas in FIG. 2 already a metal-plate and/or a metal-layer has been attached or deposited to the lid in order to form up the FOV-limiting aperture.

FIG. 3 shows the physical details and composition of transmission, reflection, absorption, convection, etc. of thermal energy/flux/radiation to, through, from and within a thermopile sensor module. By configuring such a temperature sensor module some demands should be fulfilled: The transmission coefficient of the whole lid-structure through the aperture coating should be greater than 0.75, meaning the relation $\Phi_{IR,out}/\Phi_{IR,in} > 0.75$, whereas $\Phi_{IR}$ is the IR-radiation coming from the object of interest. The reflection coefficients at all layers should be smaller than 0.05, and the absorption coefficients at all layers should be smaller than 0.01, because this minimizes the self-heating of the lid structure by the object's radiation. The temperature of the lid structure should ideally be equal to the ambient temperature $T_{amb}$, because this minimizes unwanted additional IR radiation of the cover lid structure itself to the absorber within the thermopile sensor module. Therefore, it is necessary to eliminate the IR-radiation of the lid structure and the sensor packaging, because the lid structure as a single block will be an IR-emission source which has its own sensor-temperature that is non-correlated to the IR radiation of the object of interest, i.e. resulting in a non-linear, time-variant offset of the measuring result.

Therefore, there is a need to focus on the transmission of the wanted object's IR-radiation through the lid is practically always less than 100%. All IR-radiation not being transmitted is spurious IR-transmission from the lid itself. Especially the usage of an aperture for FOV-limitation further cuts away some wanted IR radiation and the aperture itself emits some IR-radiation of its own temperature, hence the IR-radiation of the module itself, because any body with a temperature above the absolute zero point emits heat radiation, hence radiation in the infrared range. Moreover, stacking individual parts to form, e.g. an IR-filter and/or an aperture is monetary cost and based on the assembly-process associated with alignment tolerances and so on leads to wider FOV-variations and package's outer dimensions tolerances, whereas less tolerances are finally better sellable product parameters.

SUMMARY

It is therefore the objective of some embodiments of the invention to provide an improved temperature sensor module which allows to detect a maximum of the relevant IR-radiation from an object's surface of interest as well as to generate additional information about parasitic or spurious IR-radiation that distort the relevant thermal signal in order to enable a cancellation of interfering thermal signal portions.

The object of some embodiments of the invention will be solved by a temperature sensor module comprising a temperature sensing element, a sensor-interface control integrated circuit, whereas the temperature sensing element is coupled to the sensor-interface control IC, and a lid structure and a sensor packaging both defining a field of view of the temperature sensor module, wherein the lid structure is formed by a substrate comprising a second integrated temperature sensor connected to the sensor-interface control IC or an external connected processing unit.

In some embodiments, the lid structure as well as the integrated circuit of the second temperature sensor are designed and manufactured with a regular CMOS process simultaneously. This simplifies the production process, because the IC itself forms one or more regular metal-layer as the integrated aperture, hence the lid structure for the sensor module on a silicon or germanium wafer. Moreover, the lid-integrated temperature sensor, also called second integrated temperature sensor is a simple, plain element which is read out by means of the module-internal signal-processing unit (IC) or a module-externally connected processing unit.

Furthermore, the second integrated temperature sensor can be enhanced further to form a lid-ASIC with arbitrary functionalities additional to the second integrated temperature sensor alone. Thereby, this lid-ASIC is physically separated from the sensor-interface control IC or the external connected processing unit. The sensor-interface control IC and the external connected processing unit can be also regarded as a module-internal signal-processing unit (IC) or a module-externally connected processing unit, whereas the lid-ASIC can be powered from both units in order to save overall temperature sensor module's supply interface terminals. Arbitrary functionalities additionally to the properties of temperature measuring and limiting the FOV are functionalities like emissive heating and temperature control of the lid-ASIC, optical and spectrally selective detection of non-IR emission of the measured object, and second sensor's signal processing.

In some embodiments of the invention the second integrated temperature sensor is connected to the sensor-interface control IC by integrated electrical connection wires inside the sensor packaging. The electrical connections are integrated for example into the sidewalls of the sensor packaging or sensor housing. The inventive second integrated temperature sensor IC will be connected to the top of the package of the temperature sensor module, whereas the package-cavity contains prepared electrical connections from the package-cavity side-walls' top to the inner control interface and measurement IC, such that the new IC on top of the temperature sensor module is on the one hand forming the complete lid of the module and on the other hand gets electrically connected though the package and inner bond wires to the central measurement and control IC inside the package cavity. Alternatively there can be a direct wiring of the lid-temperature to the temperature sensor module outside or inside pin. The integration of all required lid functionalities and purposes within one sub-component of the overall sensor module allows for the reduction of cost and assembly tolerances.

In some embodiments the substrate is coated with a metal-layer forming the field of view of the temperature sensor module. Using a standard CMOS process it will be very simple to produce a desired aperture for the sensor module in order to limit the incoming IR-radiation and to focus the sensor viewing on the object of interest.

In some embodiments of the temperature sensor module the substrate is coated with an anti-reflective coating and/or an IR-filter coating on a front side and/or on a backside of the substrate. The filter coating will filter out all un-wanted light and IR-radiation that would falsify the sensor signal of the temperature sensor, because only the IR-radiation of the object of interest should be detected by the temperature sensor. The temperature sensor inside the sensor packaging can be a thermocouple or a thermopile sensor element which convert the IR-radiation emitted by the object of interest into an electrical voltage. By thinning down the wafer on which the IC of the second temperature sensor in the lid structure is fabricated and covering both sides of that wafer with an anti-reflective coating and/or IR-pass-filter material it is very simple to produce the desired aperture for the module in a standard production process.

In some embodiments of the temperature sensor module the second integrated temperature sensor is a resistor or a resistor-network or a pn-junction structure. These types of sensors can be easily integrated into a silicon or germanium substrate by a standard CMOS process. Non additional production equipment is necessary.

In some embodiments of the temperature sensor module the sensor-interface control IC or the external processing unit is used to process and/or digitize and/or correct the signal generated in the temperature sensing element by a detected IR-radiation of an object from interfering thermal signal portions generated in the second temperature sensor integrated in the lid structure by parasitic IR-radiation of the lid-structure and the sensor packaging. The advantage of the additional second integrated temperature sensor in the lid structure is the maximization of the wanted signal (IR-radiation from the object's surface of interest, $\Phi_{IR,in}$) throughput within the sensor module and through the filter-coating and aperture, and the generation of additional information by means of integrated lid-temperature sensor it is possible to enable a cancellation of interfering thermal signal portions, $\Phi_{LID}$.

In some embodiments of the invention, the temperature sensing element is stacked onto the sensor-interface control IC. This is to improve the thermal coupling between temperature sensor element and sensor-interface control IC.

In some embodiments of the temperature sensor module the temperature sensing element is integrated within the sensor-interface control IC. This has the advantage of maximizing thermal signal coupling and the reduction of sensor-module internal component count, i.e. bill of material, which reduces assembly process steps and hence cost.

In some embodiments of the temperature sensor module the temperature sensing element and the sensor-interface control IC, both are embedded in an additional sub-carrier substrate. This is very effective for setting and control by design and parameter, the sub-carrier substrate thermal coupling between temperature sensor element and sensor-interface control IC. Further, this enables wafer-level processing and assembly of the inner complex: temperature sensor element, sensor-interface control IC and sub-carrier, leading to reduced cost and improved applicability of automated assembly process monitoring and control in order to optimize yield and solution uniformity.

It is very advantageous that the temperature sensor module according to some embodiments can be fabricated by a regular CMOS process or bipolar CMOS process as already stated above. A bipolar CMOS (BiCMOS) process is a combination of the two important semiconductor technologies, the bipolar and the CMOS technology. Logics, which consist of both technologies, also combine the advantages of these semiconductor technologies.

Embodiments of the invention will be explained in more detail using an exemplary embodiment illustrated below.

BRIEF DESCRIPTION OF THE FIGURES

The appended drawings are described below.

FIG. 1 shows a principle construction of an IR-sensor inside a sensor housing with an IR-transparent lid structure (state-of-the-art).

FIG. 2 shows an IR-sensor inside a sensor housing with an IR-transparent lid structure with a metal plate and/or a metal-layer to form up a FOV-limiting aperture (state-of-the-art).

FIG. 4 shows an IR-sensor module according to some embodiments with an enhanced lid structure with integrated temperature sensor, aperture and filter-coating.

FIG. 5, which includes FIGS. 5A, 5B, and 5C, shows embodiments of the arrangements of the temperature sensing element inside the sensor packaging.

DETAILED DESCRIPTION

Figure 3:
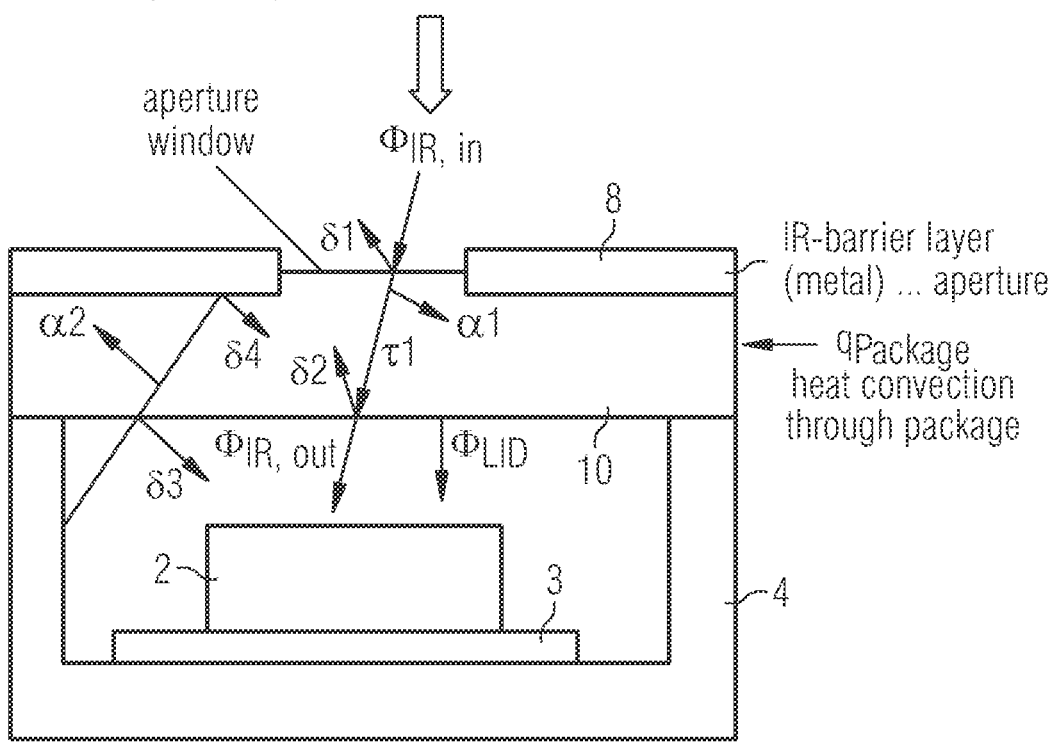
FIG. 3 shows an IR-sensor inside a sensor housing with a lid structure illustrating the physical details and compositions of transmission, reflection, absorption, convection, etc. (state-of-the-art).

FIG. 4 shows the complete temperature or thermopile sensor module 1 applying the invention of an enhanced lid 6 with an integrated (convection, conduction) temperature sensor 11, aperture and filter-coating 13, 14. The lid-integrated temperature sensor 11 is a simple, plain element (e.g. a resistor, resistor-network or a PN-junction) which is read out by means of the module-internal signal-processing unit (IC) 3 or a module-externally connected processing unit.

The inventive second integrated temperature sensor IC 11 will be connected to the top of the package 4 of the temperature sensor module 1, whereas the package-cavity 4 contains prepared electrical connections 12 from the package-cavity side-walls' top to the inner control interface and measurement IC 3, such that the new IC on top of the temperature sensor module 1 is on the one hand forming the complete lid of the module 1 and on the other hand gets electrically connected though the package 4 and inner bond wires 12 to the central measurement and control IC 3 inside the package cavity 4. There can be a direct wiring of the lid-temperature to the temperature sensor module outside or inside pin 16. The integration of all required lid functionalities and purposes within one sub-component of the overall sensor module allows for the reduction of cost and assembly tolerances.

Consequently, the additional information of the lid-intrinsic temperature together with the MEMs-signal (mixture of IR-radiation from the object of interest and of IR-radiation from the lid itself) are available for/through the measurement and control ASIC. The measurement and control IC 3 and/or any other connected processing unit can utilize the lid-temperature information to cancel for the unwanted IR-radiation-portion collected by the MEMs to finally improve signal quality, e.g. accuracy, stability, etc. of the sensor module output.

FIG. 5 shows some arrangements of the temperature sensing element 2 inside the sensor packaging 4. According to FIG. 5a the temperature sensing element 2 is stacked onto the sensor-interface control IC 3. This has the advantage to improve the thermal coupling between temperature sensor element and sensor-interface control IC.

In FIG. 5b the temperature sensing element 2 is integrated within the sensor-interface control IC 3. This has the advantage of maximizing thermal signal coupling and the reduction of sensor-module internal component count, i.e. bill of material, which reduces assembly process steps and hence cost.

And in FIG. 5c the temperature sensing element 2 and the sensor-interface control IC 3, both are embedded in an additional sub-carrier substrate 15. This is very effective for setting and control by design and parameter, the sub-carrier substrate thermal coupling between temperature sensor element and sensor-interface control IC. Further, this enables wafer-level processing and assembly of the inner complex: temperature sensor element, sensor-interface control IC and sub-carrier, leading to reduced cost and improved applicability of automated assembly process monitoring and control in order to optimize yield and solution uniformity.

LIST OF REFERENCE SIGNS 1 temperature sensor module
2 temperature sensor element
3 sensor-interface and $T_{amb}$ measurement IC; sensor-interface control IC
4 sensor package
6 Effective field of view of the temperature sensor element
7 Object
8 Aperture
10 Lid (substrate wafer); substrate
11 Lid-integrated temperature sensor, second integrated temperature sensor
12 Integrated wires
13 Antireflection coating
14 IR-filter coating
15 sub-carrier substrate
16 inside or outside pin

The invention claimed is:

1. A temperature sensor module, comprising a temperature sensing element, a sensor-interface control integrated circuit (IC), whereas the temperature sensing element is coupled to the sensor-interface control IC, and a lid structure and a sensor packaging both defining a field of view of the temperature sensor module, wherein the lid structure is formed by a substrate in which a second integrated temperature sensor is formed, the second integrated temperature sensor being connected to the sensor-interface control IC or an external connected processing unit, the second integrated temperature sensor configured to measure a temperature of the lid structure, and
   wherein the lid structure with the second integrated temperature sensor is formed by a CMOS process.

2. The temperature sensor module according to claim 1, characterized in that the second integrated temperature sensor is connected to the sensor-interface control IC by integrated electrical connection wires inside the sensor packaging.

3. The temperature sensor module according to claim 1, characterized in that the substrate is coated with a metal-layer forming the field of view of the temperature sensor module.

4. The temperature sensor module according to claim 1, characterized in that the substrate is coated with an anti-reflective coating and/or an IR-filter coating on a front side and/or on a backside of the substrate.

5. The temperature sensor module according to claim 1, characterized in that the second integrated temperature sensor is a resistor or a resistor-network or a pn-junction structure.

6. The temperature sensor module according to claim 1, characterized in that the sensor-interface control IC or the external processing unit configured to correct the signal generated in the temperature sensing element by a detected IR-radiation of an object from interfering thermal signal portions by parasitic IR-radiation of the lid-structure and the sensor packaging as measured by the second integrated temperature sensor.

7. The temperature sensor module according to claim 1, characterized in that the temperature sensing element is stacked onto the sensor-interface control IC.

8. The temperature sensor module according to claim 1, characterized in that the temperature sensing element is integrated within the sensor-interface control IC.

9. The temperature sensor module according to claim 1, characterized in that the temperature sensing element and the sensor-interface control IC, both are embedded in an additional sub-carrier substrate.

10. The temperature sensor module according claim 1, characterized in that the temperature sensor module is fabricated by a regular CMOS or bipolar CMOS process.

\* \* \* \* \*